(12) United States Patent
Hsieh et al.

(10) Patent No.: US 6,192,034 B1
(45) Date of Patent: Feb. 20, 2001

(54) SYSTEM AND METHOD FOR NETWORK INTEGRITY MANAGEMENT

(75) Inventors: Francis Hsieh, Powell; Brad Manring, Dublin, both of OH (US)

(73) Assignee: Sterling Commerce, Inc., Dallas, TX (US)

(*) Notice: Under 35 U.S.C. 154(b), the term of this patent shall be extended for 0 days.

(21) Appl. No.: 08/885,395

(22) Filed: Jun. 30, 1997

(51) Int. Cl.[7] .............................. H04J 1/16; G06F 15/177
(52) U.S. Cl. ............................................. 370/241; 709/223
(58) Field of Search .................................. 370/242, 243, 370/244, 245, 248, 249, 252, 254, 241; 709/223, 224

(56) References Cited

U.S. PATENT DOCUMENTS

| | | | |
|---|---|---|---|
| 5,504,921 | * 4/1996 | Dev et al. | 395/800 |
| 5,790,548 | * 8/1998 | Sistanizadeh et al. | 370/401 |
| 5,802,416 | * 9/1998 | Dulman | 379/34 |
| 6,108,782 | * 8/2000 | Fletcher et al. | 713/153 |

* cited by examiner

Primary Examiner—Chau Nguyen
Assistant Examiner—Chiho Andrew Lee
(74) Attorney, Agent, or Firm—Baker Botts L.L.P.

(57) ABSTRACT

A system and method for network integrity management are provided. A plurality of network elements (108) and software elements (114) are interconnected in a network. Each network element (108) and software element (114) includes an SNMP agent (110, 116) operable to create and maintain a management information base (112, 118) that stores information representing a current status of the associated network element (108) or software element (114). The SNMP agent (110, 116) is further operable to communicate the management information base (112, 118) across the network, and a remote monitor (102) is operable to collect the management information bases (112, 118) communicated by the SNMP agents (110, 116). A management client (120) is operable to connect to the remote monitor (102) and to receive the management information bases (112, 118) collected by the remote monitor (102). The management client (120) is further operable to determine the current status of the network elements (108) and the software elements (114) based upon the management information bases (112, 118), to identify problems based upon the current status of the network elements (108) and the software elements (114), and to notify a user of any identified problems.

14 Claims, 2 Drawing Sheets

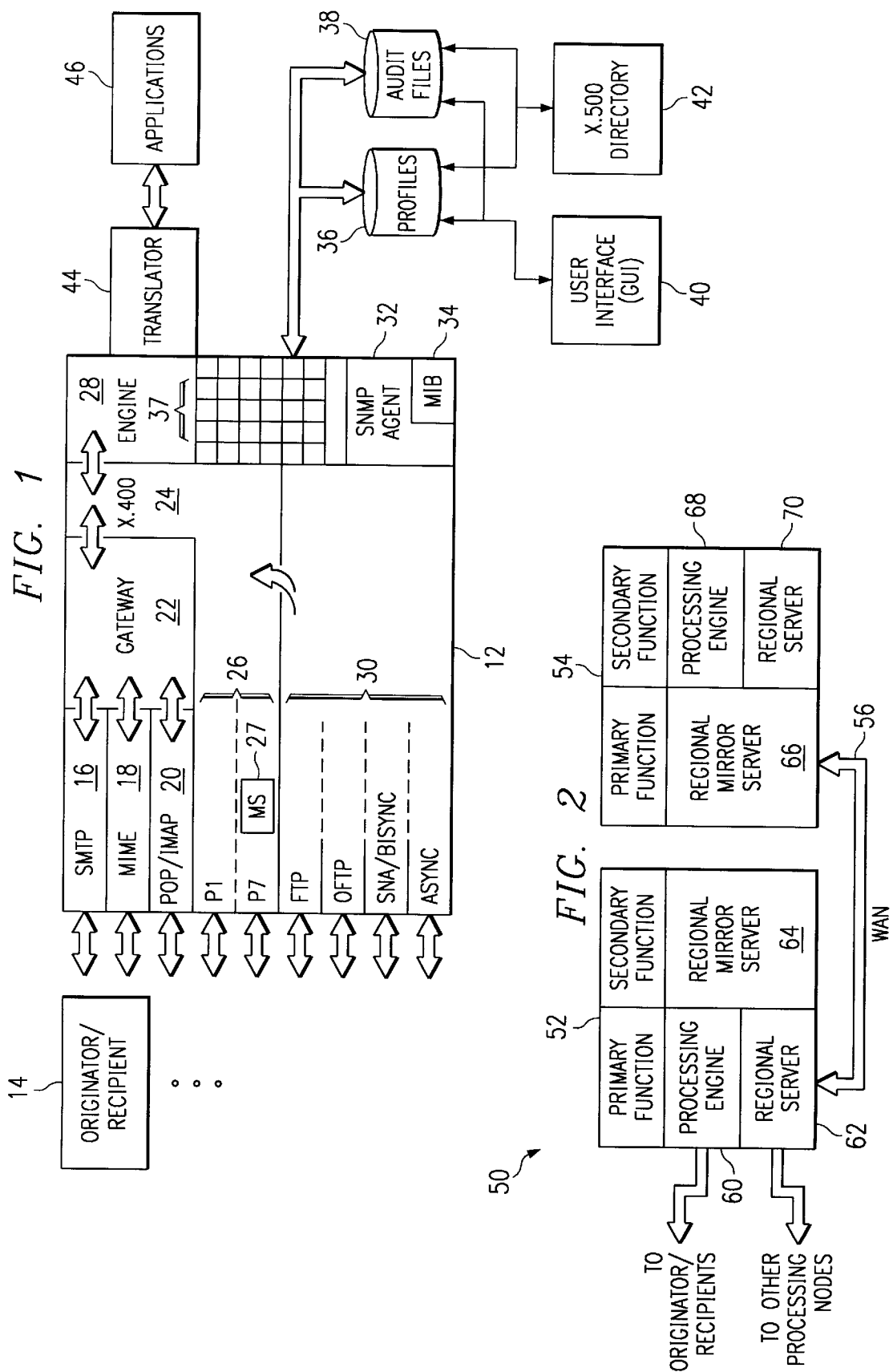

SYSTEM AND METHOD FOR NETWORK INTEGRITY MANAGEMENT

CROSS REFERENCE TO RELATED APPLICATIONS

This application is related to the following application which is incorporated herein by reference: U.S. application Ser. No. 08/884,882 filed Jun. 30, 1997 and entitled ELECTRONIC COMMERCE DISTRIBUTED NETWORK AND METHOD (Attorney Docket No. 021768.0120).

TECHNICAL FIELD OF THE INVENTION

This invention relates in general to the field of electronic commerce, and more particularly to a system and method for network integrity management.

BACKGROUND OF THE INVENTION

Organizations in various industries use electronic commerce for communicating business information including purchase order and order supply information. One method for communicating electronic commerce information uses a value added network as a clearing house for messages between organizations. The value added network thereby allows organizations to participate in electronic commerce in an efficient and cost effective manner. Such a value added network provides connectivity for participating organizations and, in general, can receive messages from originator organizations, process the messages, and forward appropriate messages to recipient organizations.

Electronic commerce networks, whether or not based upon a value added architecture, need to be managed to ensure that the network does not go down because of failure of hardware or software elements within the network. This management of network integrity is typically a reactive process of identifying and correcting points of failure after they have occurred. There is little ability to monitor the status of the network in real-time and proactively identify potential problem elements before actual failures occur. The problems of network integrity management are augmented when if network is distributed in nature and has elements in geographically remote locations.

SUMMARY OF THE INVENTION

In accordance with the present invention, a system and method for network integrity management are disclosed that substantially eliminate or reduce disadvantages and problems associated with previously developed methods for managing the integrity of electronic commerce networks.

According to one embodiment of the present invention, a system and method for network integrity management are provided. A plurality of network elements and software elements are interconnected in a network. Each network element and software element include an SNMP agent operable to create and maintain a management information base. The management information base stores information representing a current status of the associated network element or software element. The SNMP agent is further operable to communicate the management information base across the network. A remote monitor is interconnected in the network with the plurality of network elements and the plurality of software elements. The remote monitor is operable to collect the management information bases communicated by the SNMP agents. A management client is operable to connect to the remote monitor and to receive the management information bases collected by the remote monitor. The management client is further operable to determine the current status of the network elements and the software elements based upon the management information bases, to identify problems based upon the current status of the network elements and the software elements, and to notify a user of any identified problems.

A technical advantage of the present invention is the ability to monitor software applications and hardware devices executing on an electronic commerce network in real-time. This allows an owner or operator of the network to monitor the integrity of the electronic commerce network in real time in order to identify problems when they occur and even to anticipate problems before they occur.

A further technical advantage of the present invention is the ability to monitor and provide service to participating organizations that connect to the network integrity management system based upon SNMP agents and MIBs maintained by software used by the organization to connect to the electronic commerce network.

BRIEF DESCRIPTION OF THE DRAWINGS

A more complete understanding of the present invention and advantages thereof may be acquired by referring to the following description taken in conjunction with the accompanying drawings in which like reference indicate like features, and wherein:

FIG. 1 is block diagram of one embodiment of a processing engine for a processing node of an electronic commerce distributed network;

FIG. 2 is a block diagram of one embodiment of a processing node of an electronic commerce distributed network;

DETAILED DESCRIPTION OF THE INVENTION

Figure 3:
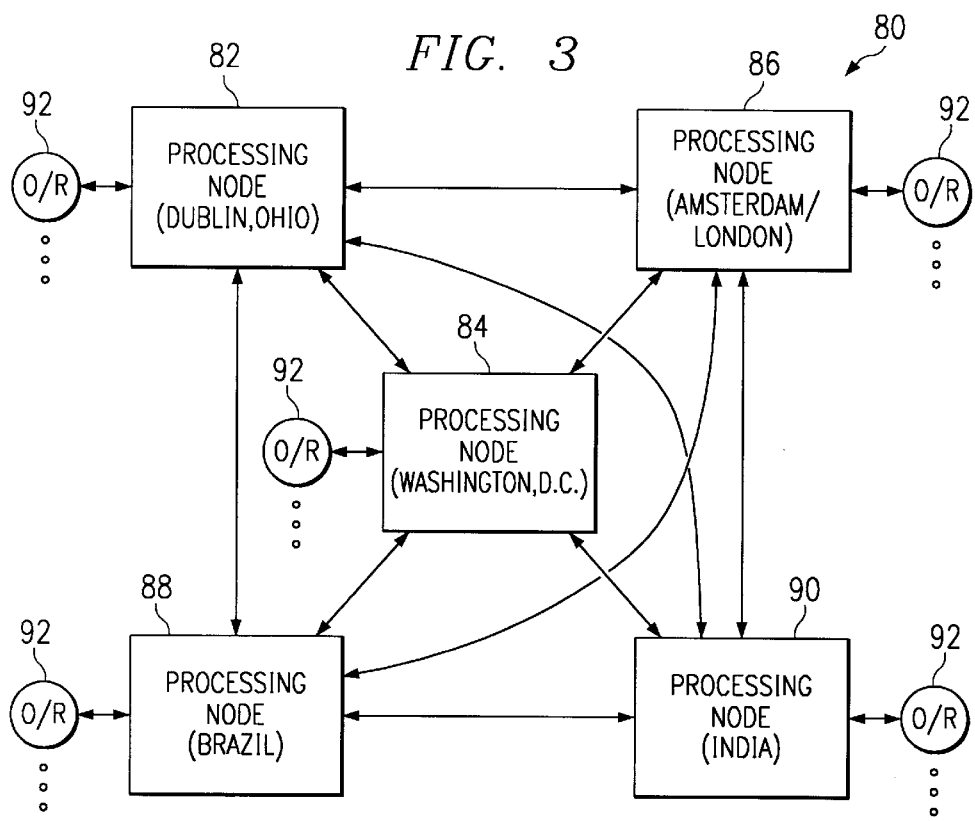
FIG. 3 is a block diagram of one embodiment of a plurality of processing nodes forming an electronic commerce distributed network.

FIG. 1 is a block diagram of one embodiment of a processing engine 12 for a processing node of an electronic commerce distributed network constructed. Processing engine 12 provides connectivity and message processing and delivery for a plurality of originator/recipient organizations 14 that participate in electronic commerce by communicating electronic messages. Each organization 14 can communicate with processing engine 12 using one of a plurality of communication networks and associated network communication protocols.

Processing engine 12 includes a simple mail transfer protocol (SMTP) unit 16 that can provide dedicated mail messaging capabilities to an organization 14. Processing engine 12 also includes a multipurpose Internet messaging extension (MIME) unit 18 that also provides a dedicated mail message functionality for an organization 14. Processing engine 12 further includes a post office protocol (POP) unit or IMAP (Internet message application protocol) unit 20 that can provide a post office for electronic commerce messages for an organization 14. SMTP unit 16, MIME unit 18, and POP/IMAP unit 20 are connected to and communicate with a gateway unit 22. Gateway unit 22 is connected to an X.400 unit 24. Gateway unit 22 converts messages from the format associated with SMTP unit 16, MIME unit 18 or POP/IMAP unit 20 to the format associated with X.400 unit 24 and vice versa. Organizations 14 can also connect directly to X.400 unit 24 via X.400 connections, indicated generally at 26, which can include a P1 and a P7 connection. The P1 connection can provide an administrative management domain (ADMD) or a private management domain (PRMD) for an organization 14, while the P7 connection can provide a direct dial-up connection for an organization 14. The P7 connection can also include a message store unit 27. This message store unit 27 can store and provide messages to the X.400 unit 24 and to a connecting organization 14. Processing engine 12 can include additional communication links, indicated generally at 30. For example, additional links 30 can include FTP access, OFTP access, SNA/BISYNC access, and ASYNC access. Messages for these additional links 30 are translated into X.400 format and provided to X.400 unit 24. Processing engine 12 further includes a simple network management protocol (SNMP) agent 32 that maintains a management information base (MIB) 34. SNMP agent 32 and MIB 34 can be used by a system for network integrity management as discussed with respect to FIG. 4, below.

X.400 unit 24 is connected to an engine 28. X.400 unit 24 provides messages received from originator organizations 14 to engine 28 and receives from engine 28 messages to recipient organizations 14. After receiving a message from X.400 unit 24, engine 28 processes each message. This processing can include reviewing a profile 36 associated with the originator organization 14 and recipient organizations 14, selecting functions to invoke according to the profile 36 of the originator organization 14 and recipient organizations 14, and sending outgoing messages to X.400 unit 24 for communication to recipient organizations 14. Profiles 36 describe characteristics and parameters for each organization 14 with respect to how that organization 14 connects to and participates in electronic commerce. Engine 28 uses the information in profiles 36 as guidance for processing messages received from originator organizations 14 and to build messages for communication to recipient organizations 14. Engine 28 can invoke one or more of a matrix of functions, indicated generally at 37, for processing messages. Matrix of functions 37 can include performing electronic data interchange (EDI) conversion, generating acknowledgments, faxing, generating copies to appropriate organizations 14, performing encryption and decryption, performing encoding and decoding, virus checking, data integrity checking, providing reports, and providing translations. In general, matrix of functions 37 can include any functionality needed for processing messages communicated between originator organizations 14 and recipient organizations 14. Engine 28 also maintains and accesses audit files 38 which provide a log of the message processing that has been performed by engine 28 with respect to each organization 14.

Processing engine 12 can provide organizations 14 with external access to profiles 36 and audit files 38 through, for example, an external user interface (GUI) 40 or an X.500 directory 42. User interface 40 provides a remote interface screen to allow organizations 14 to query and update profiles 36 and to review audit files 38. X.500 directory 42 provides a back end into profiles 36 through Internet access, or other public data network access, into X.500 directory 42. This X.500 directory 42 is generally for inquiry only, and can be based upon an LDAP or DUA format. X.500 directory 42 can provide, for example, public encryption keys based upon profiles 36 of each organization 14.

Processing engine 12 can also be connected to a translator unit 44 for providing an interface to existing applications 46 in a computer environment of an owner or operator of processing engine 12. Through applications 46 and translator unit 44, an operator or owner of processing engine 12 can participate in electronic commerce with organizations 14 through a high speed direct connection between engine 28 and applications 46.

FIG. 2 is a block diagram of one embodiment of a processing node, indicated generally at 50, for an electronic commerce distributed network. Processing node 50 includes a first sub-node 52 and a second sub-node 54. Sub-node 52 and sub-node 54 are connected with one another by a wide area network (WAN) 56, or other appropriate network connection. Sub-node 52 and sub-node 54 can be installed at geographically separate locations to isolate sub-node 54 from external or internal environment problems that may affect sub-node 52, and vice versa. Sub-node 52 and sub-node 54 each have a primary function and a secondary function where sub-node 52 is currently the active sub-node, and sub-node 54 is the mirror sub-node.

Sub-node 52 has a primary function which includes operating as a processing engine 60 and a regional server 62. Processing engine 60 of sub-node 52 can be a processing engine as shown in and described with respect to FIG. 1. The secondary function of sub-node 52 is as a regional mirror server 64. Regional server 62 provides a communication link to other processing nodes and to originator/recipients organizations. Regional server 62 also provides a communication link across WAN 56 to sub-node 54.

Sub-node 54 has a primary function which includes operating as a regional mirror server 66. The secondary function of sub-node 54 is as a processing engine 68 and a regional server 70. As with sub-node 52, processing engine 68 of sub-node 54 can be implemented as shown in and described with respect to FIG. 1. Regional mirror server 66 of sub-node 54 communicates with regional server 62 of sub-node 52 across WAN 56.

In one embodiment, sub-node 52 and sub-node 54 are implemented on a computer work station running a windows NT platform and executing the processing engine, regional server and regional mirror server applications. In this embodiment, WAN 56 can be a frame relay, ATM or IP network. Also in this embodiment, processing node 50 uses a technology referred to as OCTOPUS for performing the mirroring as a relatively low level, I/O buffer, two phase commit process between sub-node 52 and sub-node 54.

Regional mirror server 66 operates to maintain processing engine 68 and regional server 70 so that they mirror the state of regional server 62 and processing engine 60. This mirroring allows sub-node 54 to replace sub-node 52 if, for some reason, sub-node 52 goes off-line. In the event that sub-node 52 goes off-line, the primary function and secondary function of sub-node 54 can be reversed so that the primary function of sub-node 54 becomes operating as processing engine 68 and regional server 70. Similarly, the primary function and secondary function of sub-node 52 can be reversed, once sub-node 52 comes on-line, so that the primary function of sub-node 52 becomes operating as regional mirror server 64. After this switch, sub-node 54 would be the active sub-node, while sub-node 52 would be the mirror sub-node. Because processing node 50 has two mirrored sub-nodes, processing node 50 can survive a catastrophic failure of one of the sub-nodes without affecting its service to participating organizations. In one embodiment, organizations are connected transparently to the active sub-node regardless of which sub-node they attempt to access.

When a plurality of processing nodes 50 are used within an electronic commerce network, the mirroring and back-up capability provided by each pair of sub-nodes allows each processing node 50, and thereby the entire network, to survive catastrophic failure at any of the sub-nodes. This robust feature is particularly important for an electronic commerce network because it is paramount that the network not go down for any significant length of time.

FIG. 3 is a block diagram of one embodiment of an electronic commerce distributed network, indicated generally at 80, formed by a plurality of processing nodes. The processing nodes can be constructed as shown in and described with respect to FIGS. 1 and 2. In the embodiment of FIG. 3, electronic commerce distributed network 80 includes five processing nodes. A first processing node 82 is located in Dublin, Ohio. A second processing node 84 is located in Washington, D.C. Further processing nodes 86, 88 and 90 are located in Amsterdam/London, Brazil and India, as shown. It should be understood, of course, that the geographical locations for the processing nodes and the number of processing nodes in the network can be changed and implemented as desired.

Each processing node 82, 84, 86, 88 and 90 provides network connections for originator/recipient organizations 92 and processes electronic commerce messages communicated between organizations 92. Processing nodes 82, 84, 86, 88, 90 enable communication between organizations 92 using sub-nodes and processing engines as described with respect to FIGS. 1 and 2. Thus, it should be understood that each processing node shown in FIG. 3 includes two sub-nodes, each of which can operate as a processing engine, a regional server, and a regional mirror server. According to one embodiment, a processing node of the network 80 of FIG. 3 could serve as a private electronic commerce network for organizations 92 located within the local geographic area of the processing node. A processing node could also serve as a reseller of electronic commerce functionality to trading partners located within its regional area. Thus, it is possible for equipment to be supplied to entities in different countries such that those entities can establish processing nodes on the network and become resellers of electronic commerce value added network technology within their region.

Figure 4:
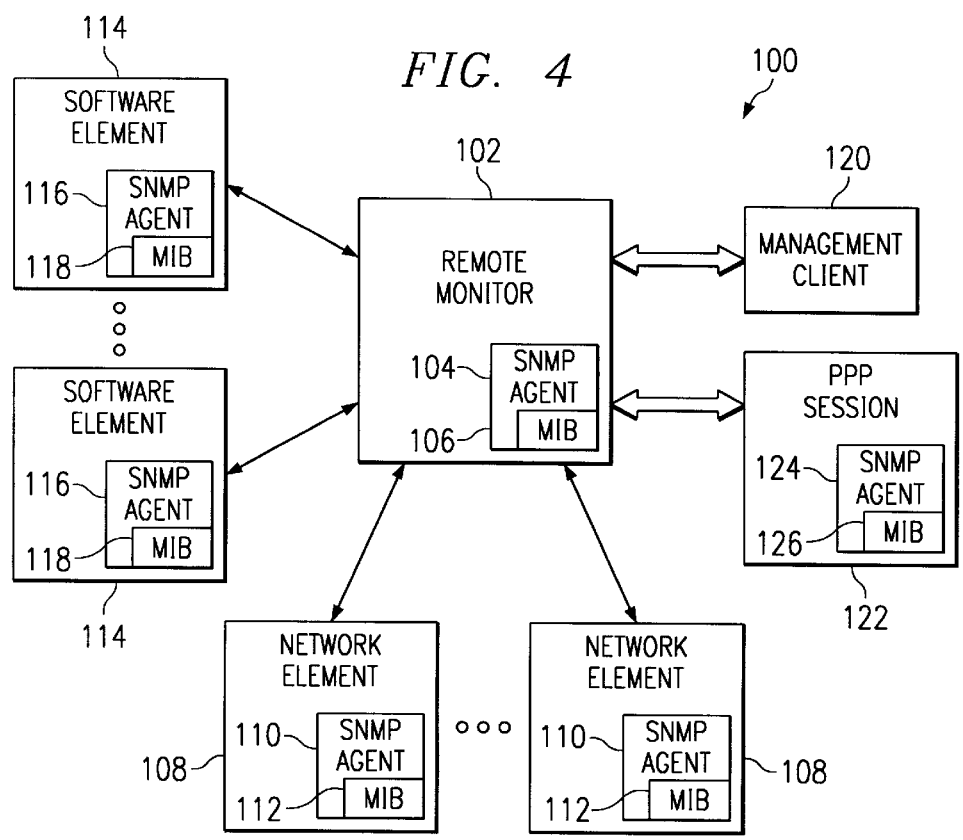
FIG. 4 is a block diagram of one embodiment of a system for managing network integrity in an electronic commerce network constructed according to the teachings of the present invention.

FIG. 4 is a block diagram of a system, indicated generally at 100, for managing network integrity within an electronic commerce network constructed according to the teachings of the present invention. System 100 can be used within an electronic commerce distributed network as shown in and described with respect to FIGS. 1, 2 and 3. However, system 100 can also be used in other types of electronic commerce networks. As shown in FIG. 4, system 100 includes a remote monitor 102 that has a simple network management protocol (SNMP) agent 104 which maintains a management information base (MIB) 106. Remote monitor 102 is connected to and communicates with a plurality of network elements 108. Network elements 108 represent various hardware elements within the electronic commerce network such as computers, modems, printers, etc. Each network element 108 includes an SNMP agent 110 that maintains a MIB 112. Remote monitor 102 also is connected to and communicates with a plurality of software elements 114 within the electronic commerce network. Software elements 114 represent various software applications running within the network including, for example, the processing engine, regional server and regional mirror server of FIGS. 1 and 2. Each software element 114 includes an SNMP agent 116 which maintains a MIB 118. SNMP agents 104, 110 and 116 store information representing the status of their respective network pieces in MIBs 106, 112 and 118. SNMP agents 104, 110 and 116 also communicate with remote monitor 102 across the electronic commerce network.

Remote monitor 102 can receive and store MIB information from SNMP agents 104, 110 and 116 which can be sent in response to certain events or in response to a query from remote monitor 102. In this manner, remote monitor 102 operates to collect health information about the network based upon the information stored in MIBs 106, 112 and 118. Each MIB 106, 112 and 118 can be a sequential file of information which describes the status of the associated network element 108 or software element 114. Remote monitor 102 can query SNMP agents 104, 110 and 116 to get that information and thereby obtain status of the network hardware elements 108 and software elements 114. In one embodiment, the various SNMP agents 104, 110 and 116 communicate using an IP address on the network. Each SNMP agent 104, 110 and 116 is able to record information based upon traps of events and to record information based upon queries from remote monitor 102. For example, each MIB 118 can maintain information about software elements 114 such as the number of characters transmitted per hour and the number of responses communicated per hour. Remote monitor 102 collects and organizes the information gathered from SNMP agents 104, 110 and 116.

A management client 120 communicates with remote monitor 102 to provide access to information maintained by remote monitor 102. In addition, a point-to-point protocol (PPP) session 122 can be used to connect to and access information in remote monitor 102. Management client 120 provides access to remote monitor 102 in order to present the MIB information to a user as well as to monitor and display problems with the electronic commerce network. In one embodiment of the present invention, the connection between management client 120 and remote monitor 102 is over an IP network. After receiving status information from remote monitor 102, management client 120 can determine the status of the network and compare the network status with desired or threshold values. Management client 120 can then notify a user of problems with the network in real-time as those problems occur. In one embodiment, management client 120 can display network status information on a map that illustrates the geographical locations of the various parts of the network. In one implementation, management client 120 is based upon a HEWLETT PACKARD OPEN VIEW system although a SUN SOLSTICE, IBM NETVIEW or other appropriate system could be used.

PPP (point-to-point protocol) session 122 can also be used to connect to and receive information from remote monitor 102. Using PPP session 122, a user can receive the SNMP messages that SNMP agents 104, 110 and 116 use to communicate the MIB information. PPP session 122 can set thresholds that indicate when the MIB information represents a trouble situation and can notify a user of the problem. Even where there are no problems, PPP session 122 can also provide a user with the current state of the network. According to the present invention, the MIB information can be parsed and sorted so that different organizations can use PPP session 122 to access only the MIB information relevant to their interest in the electronic commerce network.

An additional feature is that after an organization has connected into remote monitor 102 via PPP session 122, the organization's connection software application can itself have an SNMP agent 124 that maintains a MIB 126. In this manner, remote monitor 102 can receive information about the organization's computer system. An owner or operator of the electronic commerce network and of management client 120 could then proactively monitor the status of the organization who invoked PPP session 122 and inform the organization's of problems before the organization, itself, is be aware.

System 100 can provide, for example, two important network integrity management functions. System 100 can allow an owner or operator of the electronic commerce network to monitor the state of the network in real-time so that problems can be quickly identified or even anticipated. System 100 also provides participant organizations with a window into the state of the electronic commerce network. The status of the network can be securely broadcast to organizations in the form of MIB information so that the organization can have higher confidence in the integrity of the electronic commerce network.

Although the present invention has been described in detail, it should be understood that various changes, substitutions and alterations can be made hereto without departing from the spirit and scope of the invention as defined by the appended claims.

What is claimed is:

1. A system for network integrity management, comprising:
   a plurality of network elements interconnected in a network, each network element comprising:
      an SNMP agent operable to create and maintain a management information base, the management information base storing information representing a current status of the network element;
      the SNMP agent further operable to communicate the information in the management information base across the network
   a plurality of software elements interconnected in the network, each software element comprising:
      an SNMP agent operable to create and maintain a management information base for the software element, the management information base storing information representing a current status of the software element;
      the SNMP agent further operable to communicate the information in the management Information base across the network;
   a remote monitor interconnected in the network with the plurality of network elements and the plurality of software elements, the remote monitor operable to collect the information from the management information bases communicated by the SNMP agents in the plurality of network elements and the plurality of software elements; and
   a management client operable to connect to the remote monitor and to receive the information from the management information bases collected by the remote monitor;
   the management client further operable to determine the current status of the network elements and the software elements based upon the information from the management information bases, to identify problems based upon the current status of the network elements and the software elements, and to notify a user of any identified problems.

2. The system of claim 1, wherein the remote monitor is further operable to allow connection of a point-to-point session, such that the point-to-point session can receive the information from the management information bases collected by the remote monitor, determine the current status of the network elements and the software elements based upon the information from the management information bases, and display to a user the current status.

3. The system of claim 2, wherein the point-to-point session is operable only to receive the information from the management information bases relevant to the users participation in the network.

4. The system of claim 3, wherein the network is an electronic commerce network.

5. The system of claim 2, wherein the point-to-point session comprises an SNMP agent operable to create and maintain a management information base storing information representing a current status of the user's computer environment,
   the SNMP agent further operable to communicate the information in the management information base across the network to the remote monitor,
   such that the management client can identify problems with the user's computer environment.

6. The system of claim 1, wherein the plurality of network elements includes hardware for a processing node in an electronic commerce network.

7. The system of claim 6, wherein the plurality of software elements include a processing engine, a regional server and a regional mirror server executing on the hardware for the processing node.

8. A method for network integrity management, comprising:
   operating an SNMP agent in each of a plurality of network elements interconnected in a network, where each SNMP agent:
      creates and maintains a management information base storing information representing a current status of an associated network element; and
      communicates the information in the management information base across the network;
   operating an SNMP agent in each of a plurality of software elements interconnected in the network, where each SNMP agent:
      creates and maintains a management information base storing information representing a current status of an associated software element; and
      communicates the information in the management information base across the network;
   collecting the information from the management information bases communicated by the SNMP agents in the plurality of network elements and the plurality of software elements;
   determining the current status of the network elements and the software elements based upon the information from the management information bases;
   identifying problems based upon the current status of the network elements and the software elements; and
   providing notification of any identified problems.

9. The method of claim 8, further comprising receiving the information from the management information bases communicated by the SNMP agents in a point-to-point session, such that the point-to-point session can determine the current status of the network elements and the software elements based upon the information from the management information bases and display the current status to a user.

10. The method of claim 9, wherein only the information from the management information bases relevant to the users participation in the network are received.

11. The method of claim 10, wherein the network is an electronic commerce network.

12. The method of claim 9, further comprising:
creating and maintaining a management information base storing information representing a current status of the user's computer environment; and
communicating the information in the management information base across the network;
such that problems with the user's computer environment can be identified.

13. The method of claim 8, wherein the plurality of network elements includes hardware for a processing node in an electronic commerce network.

14. The method of claim 13, wherein the plurality of software elements include a processing engine, a regional server and a regional mirror server executing on the hardware for the processing node.

* * * * *